A. J. EAVES.
TELEGRAPH REPEATING SYSTEM.
APPLICATION FILED NOV. 12, 1919.
1,353,464.　　　　　　　　　Patented Sept. 21, 1920.
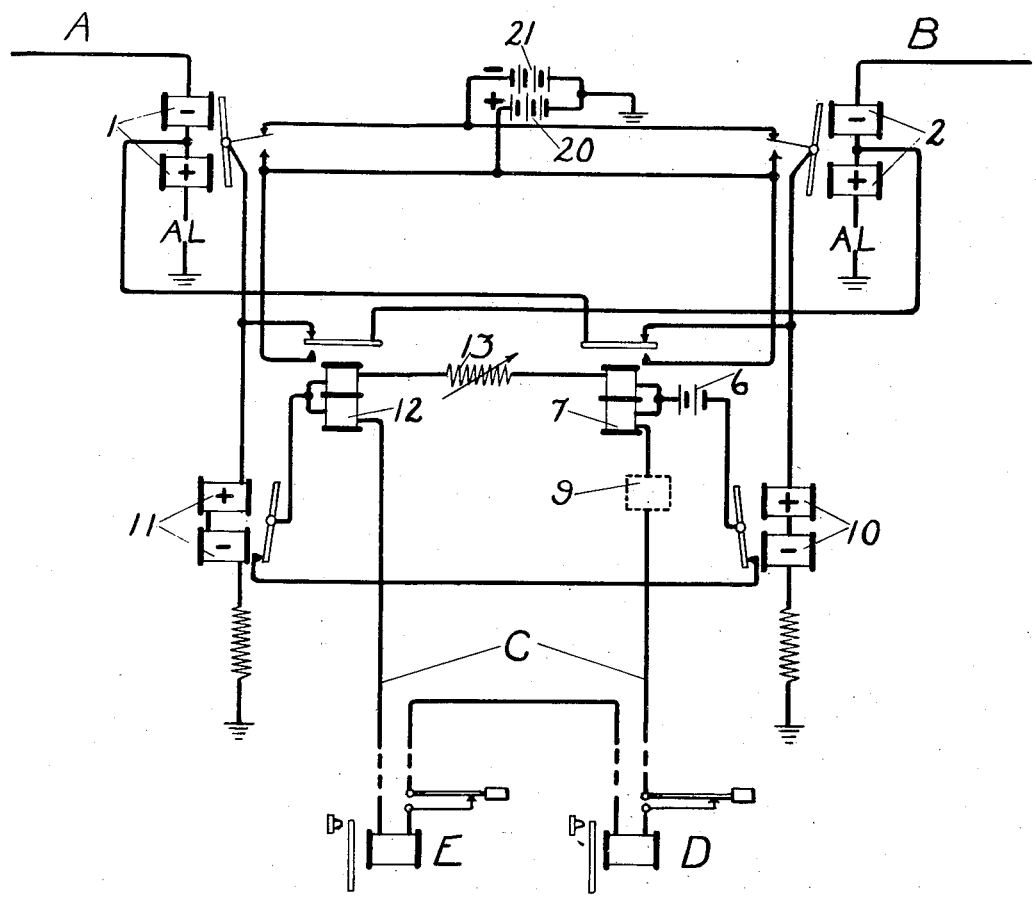
Inventor:
Augustus J. Eaves.
by　　　　　　　Atty.

UNITED STATES PATENT OFFICE.

AUGUSTUS J. EAVES, OF NEW YORK, N. Y., ASSIGNOR TO WESTERN ELECTRIC COMPANY, INCORPORATED, OF NEW YORK, N. Y., A CORPORATION OF NEW YORK.

TELEGRAPH REPEATING SYSTEM.

1,353,464.  Specification of Letters Patent.  Patented Sept. 21, 1920.

Application filed November 12, 1919. Serial No. 337,447.

*To all whom it may concern:*

Be it known that I, AUGUSTUS J. EAVES, a citizen of the United States, residing at New York, in the county of New York, State of New York, have invented certain new and useful Improvements in Telegraph Repeating Systems, of which the following is a full, clear, concise, and exact description.

This invention relates to telegraph repeating systems and more particularly to repeating systems operated according to the half-duplex method.

The principal object of this invention is to provide an organization of apparatus to improve the speed or rate at which signaling impulses may be transmitted over a line circuit to which loop circuits are connected, while rendering more reliable "through" service between the different main line sections of such a system.

It is known that the time constant of a telegraph circuit will vary almost directly with the inductance and resistance of the line, and that the latter factors are relatively proportional to the number of receiving devices in the circuit and to the length of the line. It will therefore be obvious that if loop circuits extending from a through or main line are arranged to operate in series with the main line the inductance and resistance of the loop circuits will increase the so-called line-lag of the entire circuit and thereby reduce the speed at which signals may be transmitted thereover. A further disadvantage of the series arrangement is the possibility of interruption of through service on the main line due to irregularities or troubles which may occur on a loop portion of the system.

In order to overcome the objections above pointed out, the present invention contemplates associating the loop circuit with the main line by means of a repeating station comprising a plurality of relays arranged to repeat signals between the two main line sections and also into a loop circuit. In turn, signals originating in the loop circuit may be repeated into each of the two main line sections.

The invention is illustrated diagrammatically in the accompanying drawing in which only so much of a telegraph system has been shown as will be necessary to a clear understanding of the features of the system.

Referring to the drawing, two main line sections A and B terminate in respective duplex network comprising polar relays 1 and 2 and associated artificial lines AL. A loop circuit C routed through transmitting and receiving equipments at stations D and E receives current from a battery 6 at the repeater station. One lead from the battery 6 extends through the lowermost winding of a relay 7 to one side of the loop circuit while the other terminal of this battery is connected through the contacts of two polarized sounder relays 10 and 11 and the lowermost winding of a relay 12 to the other side of the loop. An artificial line to balance the loop circuit C is formed of an adjustable resistance 13 connected in a closed loop which is completed through the uppermost winding of the relay 7, the battery 6, the circuit already traced through the contacts of the sounder relays 10 and 11, thence through the uppermost winding of the relay 12.

The relays 7 and 12 being differentially wound are normally deënergized due to the fact that current from battery 6 divides equally between the artificial line 13 and the loop C. When a transmitting key at a station D, for example, on the loop circuit is opened, the differential balance of relays 7 and 12 is destroyed and these relays will consequently respond to current flowing, through the circuit of the resistance 13. Thereupon an impulse of positive current from a battery 20 may flow by way of the forward contacts of the relay 7 to the outgoing or neutral point on the duplex equipment of the line B, to affect receiving devices at distant stations thereon. A similar impulse from the battery 20 will also flow by way of the forward contacts of the relay 12 to the neutral point on the duplex equipment of the line B, to affect receiving devices at distant stations thereon. Conversely when the transmitting key at station D is closed, the differential balance of the relays 7 and 12 is restored and the negative pole of battery 21 will be connected by way of the back contacts of relays 7 and 12 to lines B and A respectively.

Signals characterized by current reversals originating in the line A control the armature of the polar relay 1 which through its contacts sends out corresponding current reversals to line B from batteries 20 and 21 by way of the back contact of relay 12. These current reversals also affect the polarized sounder relay 11. A positive impulse, for example, causes relay 11 to open the circuit of battery 6 and thereby deënergize both the loop circuit C and its associated balancing circuit 13. This causes the release of the line relays at stations D and E without causing any actuation of relays 7 and 12.

In a corresponding manner similar current reversals originating at a station on the line B cause the polar relay 2 to apply current from the batteries 20 and 21 by way of the normal contacts of the relay 7 to the line A. These changes of polarity also cause the actuation of the polarized relay sounder 10 and through it the repetition of the signals into the loop circuit C.

At the repeater station the signals being repeated from line A to line B and vice versa may be read directly from the relay sounders 10 and 11. If corresponding supervision of the signals originating in the loop circuit C, is desired, a local station 9 in the loop circuit may be provided at the repeater station and equipped with a sounder and also a transmitting key for sending to stations on lines A and B and on the loop C.

An operator on the main line sections A and B can break in on an operator sending from a loop station D by transmitting a positive impulse which causes the actuation of relay 11 or 10 as the case may be and thereby opens the bottom circuit of the loop C.

An operator at a loop station D can also break in on an operator sending from a station on line A or B by opening his sending key, thereby connecting positive battery to lines A and B as above described.

What is claimed is:

1. In a system for repeating telegraphic signals between a main line and a branch loop, an artificial balancing impedance for said branch loop, a pair of differential relays each having a winding in series with said branch loop and a winding in series with said balancing impedance, a battery circuit connecting the mid points of said relays, and means acting in response to current reversals in said main line to open and close said battery circuit.

2. In a system for repeating telegraphic signals between a main line and a branch loop, an artificial balancing impedance for said branch loop, a pair of differential relays each having a winding in series with said impedance and a winding in series with said branch loop, a battery circuit connecting the mid points of said relays, armatures for said relays, and contacts controlled thereby for reversing the current in said main line when said branch loop is opened or closed.

In witness whereof, I hereunto subscribe my name this 10th day of November, A. D., 1919.

AUGUSTUS J. EAVES.